Nov. 14, 1961 W. F. ZORNES 3,008,259
FISHING OUTRIGGER
Filed Feb. 12, 1960 2 Sheets-Sheet 2

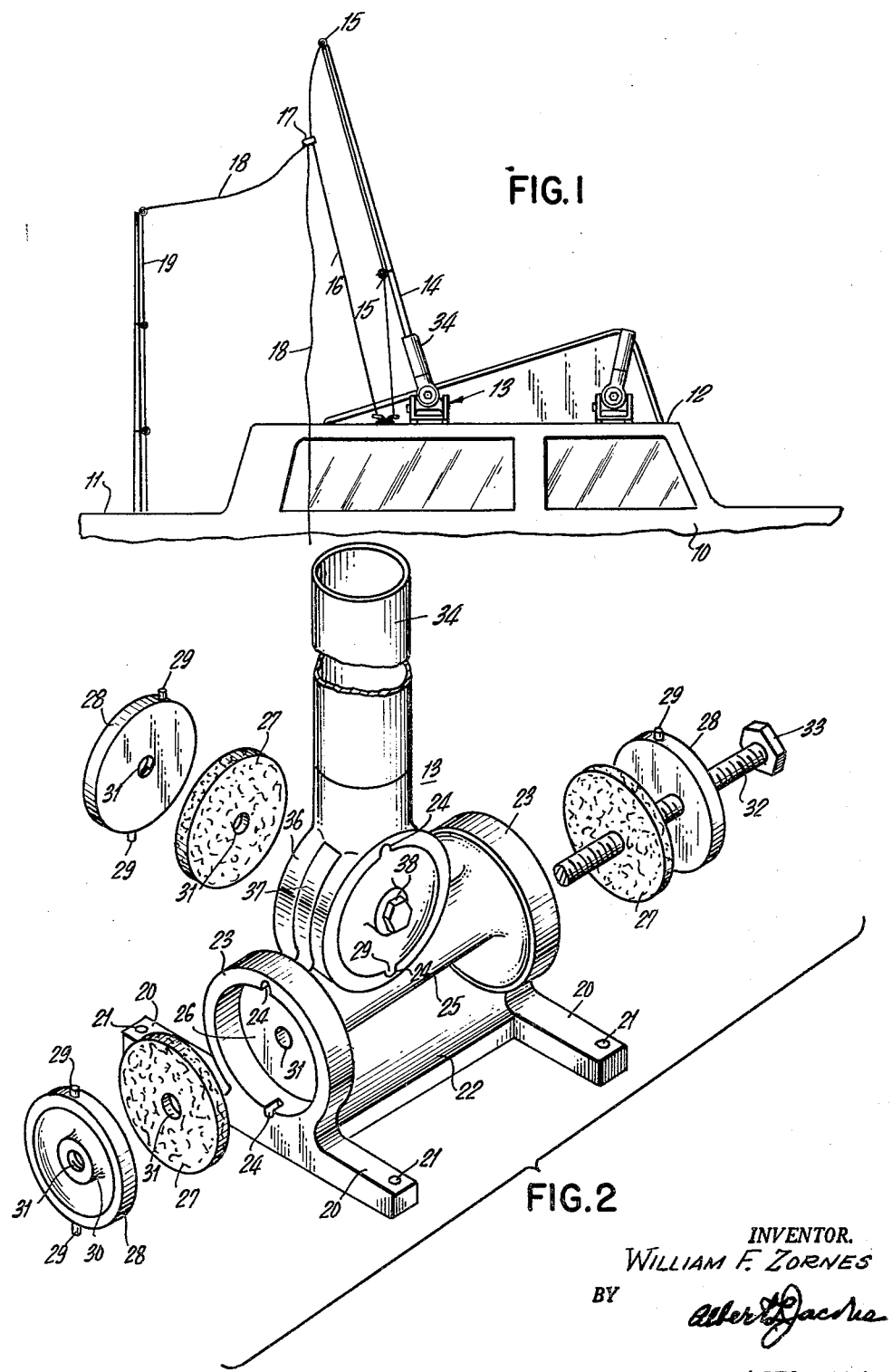

INVENTOR.
WILLIAM F. ZORNES
BY
*Albert Jacobs*
ATTORNEY 3,008,259
FISHING OUTRIGGER
William F. Zornes, 4 Pasture Lane, Levittown, N.Y.
Filed Feb. 12, 1960, Ser. No. 8,433
4 Claims. (Cl. 43—43.12)

This invention relates to game and sport fishing as well as to commercial fishing and more particularly to an outrigger by means of which adjacent fishing lines can be prevented from becoming crossed or entangled and can be maintained suitably spaced, together with other advantages referred to hereinafter.

The invention will be described and explained in connection with game fishing without limitation thereto and with the understanding that similar considerations apply to other forms of fishing. In game fishing it is customary to carry out the same from a suitable boat ordinarily provided with two or four rearwardly facing seats adjacent to or associated with each of which is the usual socket for the reception of the root end of a fishing rod. Under such conditions, the fishing lines extending from the rear of the boat are in relatively close juxtaposition to one another, so that when a "strike" occurs, it frequently happens that the lines cross or become entangled, thus making it difficult or impossible to land the fish and causing much inconvenience and waste of time in separating the fishing lines. This also occurs during normal trolling.

It is also desired under some fishing conditions to give to the bait a "skipping" action over the waves or through the crests of the waves in order to attract the fish or to keep the bait nearer the surface of the water, but such cannot be conveniently or effectively carried out except by moving the fishing rods up and down or back and forth, thus further tending toward having the fishing lines too close to one another or becoming crossed or entangled. This is even more true where there are four seats or four fishing rods in the stern section of the boat than when there are two.

It has long been sought to provide some means to overcome these disadvantages, but so far as I am aware, this result has not heretofore been obtained in any safe practicable manner.

It is an object of the present invention to provide a fishing outrigger which overcomes the above noted and other disadvantages and which has further advantages in that game fishing can be carried out more pleasantly, safely and effectively without undue loss of fishing time and while making it possible to improve the likelihood of a better catch.

A further and more specific object of the invention is to provide a fishing outrigger which can be secured to any suitable or available portion of the boat whether the surface to which the outrigger is attached be vertical, horizontal or on a slope, in self-aligning manner without wedges or other devices being required, and wherein there is a base portion securable to the boat, a tube for the reception of one end of a tip described below and means connecting the tube and base portion which, in effect, enables the tube to be moved in practically any direction and held at any desired angle under a predetermined but adjustable amount of friction without the operator being subjected to any hazards.

Other and further objects and advantages will be understood by those skilled in this art or will be apparent or pointed out hereinafter.

In the accompanying drawings, wherein I have illustrated a preferred embodiment of my new fishing outrigger:

FIG. 1 is a fragmentary side elevation of a boat, showing the arrangement of fishing rod, outrigger and tip;

FIG. 2 is an exploded perspective view of the outrigger itself;

Figure 3:
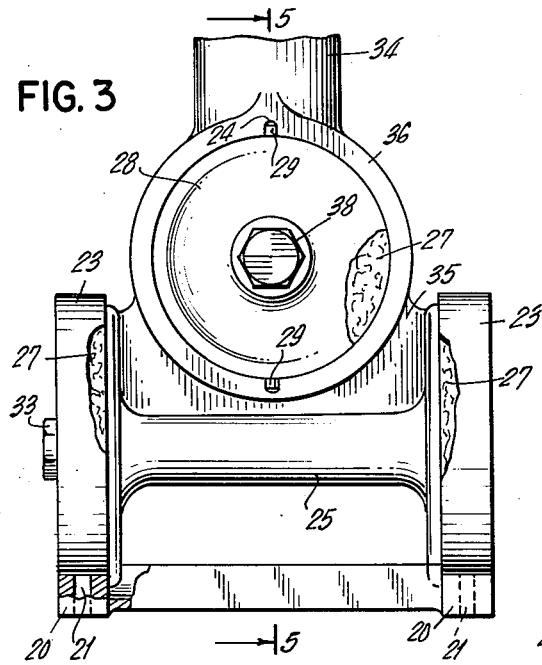
FIG. 3 is a side elevational view of the outrigger of FIG. 2 with portions broken away to show the underlying construction.
Figure 4:
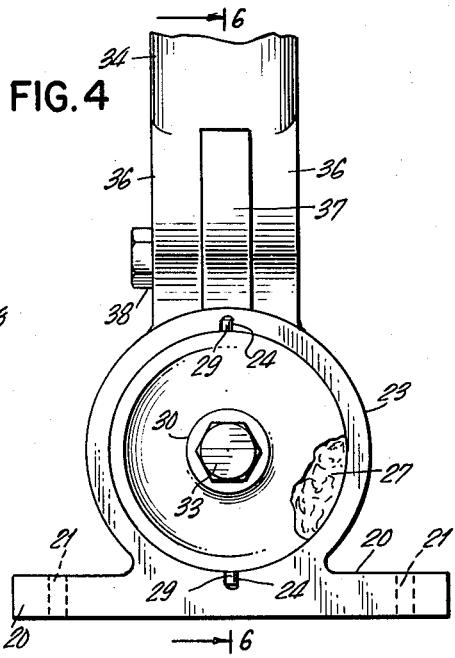
FIG. 4 is a view similar to FIG. 3, but taken at right angles thereto.
Figure 5:
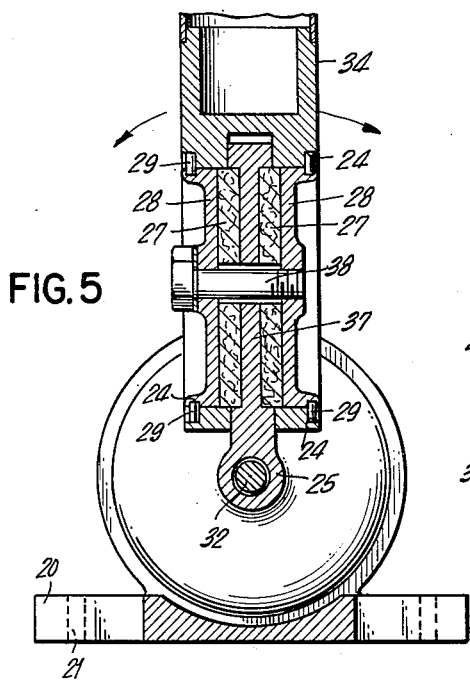
FIG. 5 is a vertical sectional view taken along line 5—5 of FIG. 3.
Figure 6:
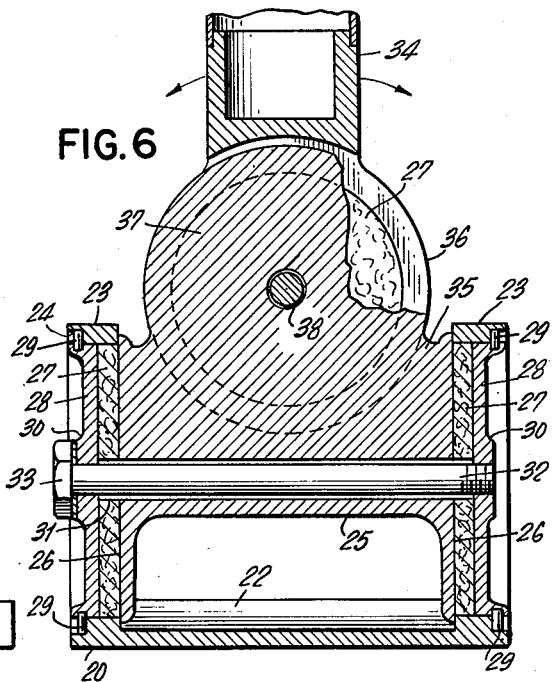
FIG. 6 is a vertical sectional view taken along line 6—6 of FIG. 4.

Referring now to the drawings in detail, numeral 10 represents a fragmentary portion of a typical boat of the flying bridge cabin type, the numeral 11 indicating the stern portion where the fishing seats are ordinarily mounted, and the numeral 12 indicating the upper surface of the cabin of such boat. It is understood that the present invention is not limited to use in connection with any specific type of boat and that the type of boat referred to is merely illustrative.

It is also to be understood that the description of the manner of mounting the outrigger on the boat is purely illustrative since the outrigger can equally well be mounted on a vertical or even a sloping surface, depending upon the size of the boat and the type of fishing involved.

In FIG. 1 the outrigger designated as a whole by the numeral 13 is mounted atop the cabin on the horizontal surface 12 and there is usually another outrigger mounted on the opposite side of the boat which may be in a corresponding position or in any other desired or available position. Before describing the structural nature of outrigger 13, it is desired to point out, as illustrated in FIG. 1, that the tube of the outrigger is adapted to receive one end of the tip 14 which is in the nature of a length of fishing rod usually having eyelets or guides 15 spaced therealong and an endless length of fishing line 16 extending therethrough and forming a somewhat loose loop to which is releasably attached a clip 17 which can be a small clothespin or like clip element through which the fishing line 18 of fishing rod 19 passes. In this way and dependent upon the angular relationship of the tube of the outrigger to the base of the outrigger, the fishing line is caused to assume a desired position with respect to the boat, but more especially with respect to the other fishing lines, of which, in a typical instance, there are three, making a total of four.

Since this type of fishing boat and the arrangement of seats and sockets is per se well known, it is unnecessary to illustrate or describe the same in detail. It will thus be seen that the portion of the fishing line 18 trailing from the boat can be given a desired positioning so that when a "strike" occurs the tension exerted by the game fish on the fishing line causes the fishing line to become detached from the clip 17 and thereafter the fishing rod is used in the normal way, but with little or no likelihood of that particular fishing line becoming crossed or entangled with other fishing lines. It is understood, of course, that the amount of line extending from the fishing rod is comparatively long and further, that the bait can be caused very effectively to skip or dance on or through wave crests and the intervening troughs as an aid in luring the fish and attracting its attention, while at the same time maintaining the positioning of the fishing line. The skipping or dancing action of the bait can be readily carried out by appropriate movements of the tube of the outrigger with relation to the base of the outrigger, plus the normal amount of movement of the bait due to forward movement of the boat.

The outrigger is preferably composed of or coated with a metal or a metallic material resistant to corrosion by salt water and may, for example, be made of stainless steel or some less expensive metal plated or clad with chromium or a chromium alloy. The outrigger has a base portion 20 provided with apertures 21, by means of which the base portion is firmly bolted to the boat. The base portion is in the nature of four projecting pieces connected by a strut or other suitable connecting member 22, which in the form shown, is concavo-convex or arcuate with its concave surface facing upwardly. In this way the spaced base portions are rigidly connected together laterally.

Each base portion has an annular collar member 23 rising therefrom and having a pair of diametrically opposed recesses 24 for a purpose to be described. A tubular member 25 extends between and connects the collar members 23 and terminates at each end in a circular portion 26 fitted within a collar member 23 and rotatable relative thereto. These circular portions form flat end faces in the collar members 23, against which fibrous or other suitable circular friction discs 27 abut. A closure disc 28 also fits within each collar member 23 and overlies the friction disc 27 in that collar member. Each closure disc 28 is provided with diametrically opposed projecting pins 29 which fit into the recesses 24 already referred to. Each closure disc 28 also has a hub-like portion 30, the outermost surface of the closure disc between the hub and its periphery being dished so that the periphery has a rim-like configuration. Each of members 25, 27 and 28 has a hole 31 therethrough, that of disc 28 being interiorly threaded.

It will be observed that threaded bolt 32 passes entirely through the tube, collar members, friction discs and closure discs, the bolt having a head 33 at one end and its opposite end terminating substantially flush with the outer face of hub-like portion 30 of the closure disc at the opposite end of the assembly. By turning the bolt 32 clockwise or counter-clockwise, viewed from the upper right-hand corner of FIG. 2, by means of a small wrench applied to head 33, the amount of friction can be made greater or smaller, i.e. the amount of friction can be adjusted to that amount desired or required for the given fishing conditions or preferred by the user of the device. In this way, there is control over the ease of movability of the tube 34 at right angles to the longitudinal axis of tubular portion 25.

Extending between the rear surfaces of the end faces forming the termini of tubular portion 25 and projecting radially from said tubular portion is the web 35 which is integral with the tube and which thus moves therewith. The tube 34 has its axis in alignment with the plane of said web and is provided with a bifurcated ring 36, the bifurcations of which fit over a disc 37 secured to the upper edge of said web in any suitable manner as by pressing, welding or soldering or may be a unitary part of said web. The disc 37 thus extends from the distal edge of the web into the space formed by the bifurcations. Each of the bifurcations is, in effect, substantially the same as the collar members 23 already described and like members 23, each is provided on its outer surface with the diametrically opposed recesses 24. Fitted into each bifurcation is a friction disc 27 identical with those described above and overlying each such friction disc is a closure disc 28 like those already described and having diametrically opposed pins 29 receivable within recesses 24 as well as the holes 31. A threaded bolt 38 extends through the assembly of ring bifurcations, friction discs and closure discs and is susceptible to the same type of adjustment as described anent bolt 32.

It will be appreciated that by these means and under a controlled amount of friction, the tube 34 can be angularly moved with respect to tubular member 25 so as to aim tube 34 in the desired direction.

It will be apparent from the foregoing that the tube 34 is movable into any one of a multiplicity of angular positions both longitudinally of tubular member 25 and transversely thereof, thus providing many possible positions to take care of whatever situation is encountered with respect to boat construction and the location in which the outrigger is mounted by its base portion.

Irrespective of whether the outrigger is mounted on a horizontal, a vertical or a sloping surface of the boat, the tube 34 can be set into virtually any desired position. It will further be appreciated that not only can the friction be varied, but the amount of friction in one direction of movement of tube 34 can be different from the amount of friction in the other direction and in all cases the amount of friction can be quickly and easily increased or decreased by the very simple expedient of applying a small wrench or other tool to the bolt heads and turning the bolts clockwise to increase the friction and counter-clockwise to decrease the friction. The outrigger, therefore, has a versatility and adaptability not shared by any known prior device.

The outrigger itself is relatively simple in construction and can moreover be moved from one position to another on the boat merely by removing the screws or other fastening instrumentalities (not shown) which pass through the openings 21 in the base portion. The arrangement is also such that the woodwork of the boat is not appreciably marred or damaged and when the outrigger is moved from one location to another on a given boat, the small holes can readily be filled. As already explained above, one end of tip 14 is inserted in the tube 34 in which it fits snugly and from which it can be easily removed, as when the boat passes under a low bridge, it being noted that a usual tip is approximately twenty feet in length and thus the outrigger can be mounted even on one of the topmost surfaces of the boat and when the boat approaches a bridge, the tip can be moved to a substantially horizontal position quickly and easily, whereas with conventional equipment considerable disassembly is required or, which is more usual, the boat must await the opening of the bridge, thereby delaying the traffic. There is thus a very big advantage in connection with the present outrigger which is not even approached by any previously known device.

The foregoing is intended as illustrative and not as limitative since within the terms of the appended claims the details of construction can be modified. The outrigger can be made in various sizes suitable for all types of sport game and commercial fishing and the invention is hence not limited to the use of the outrigger with any specified type of fishing, but has been found to be most advantageous for large game fishing such as marlin, sailfish, etc.

What is claimed is:

1. A fishing outrigger comprising a pair of spaced base portions rigidly connected together laterally, an annular collar member on each base portion having a pair of diametrically opposed recesses, a tubular member extending between the collar members and terminating in circular portions fitting within the collar members and rotatable relative thereto, said circular portions forming end faces, a friction disc in each collar member abutting one such end face, a closure disc overlying each friction disc and disposed in the collar member, a retaining bolt extending through said closure discs, friction discs, end faces and tubular member, a web extending radially from said tubular member, a tube having its axis in alignment with the plane of said web and provided with a bifurcated ring secured to said web, a disc extending from the distal edge of the web and disposed in the ring bifurcation, a friction disc on each side of the web disc, a closure disc overlying each friction disc and a retaining bolt extending through the web disc, bifurcated ring, friction discs and closure discs, each of the said retaining bolts being individually adjustable to provide a desired amount of friction in its sub-assembly, whereby said tube is movable into any one of a multiplicity of angular positions with relation to the base and under a pre-selected amount of friction.

2. A fishing outrigger comprising a pair of spaced base portions rigidly connected together laterally, an annular collar member on each base portion having a pair of diametrically opposed recesses, a tubular member extending between the collar members and terminating in circular portions fitting within the collar members and rotatable relative thereto, said circular portions forming end faces, a friction disc in each collar member abutting one such end face, a closure disc overlying each friction disc and disposed in the collar member, a retaining bolt extending through said closure discs, friction discs, end faces and tubular member, a web extending radially from said tubular member, a tube having its axis in alignment with the plane of said web and provided with a bifurcated ring secured to said web, a disc extending from the distal edge of the web and disposed in the ring bifurcation, a friction disc on each side of the web disc, a closure disc overlying each friction disc and a retaining bolt extending through the web disc, bifurcated ring, friction discs and closure discs, each of the said retaining bolts being individually adjustable to provide a desired amount of friction in its sub-assembly, whereby said tube is movable into any one of a multiplicity of angular positions with relation to the base and under a pre-selected amount of friction, each of said closure discs being provided with diametrically opposed radially projecting pins receivable in recesses provided for the purpose in the collar members.

3. A fishing outrigger comprising a pair of spaced base portions rigidly connected together laterally, an annular collar member on each base portion having a pair of diametrically opposed recesses, a tubular member extending between the collar members and terminating in circular portions fitting within the collar members and rotatable relative thereto, said circular portions forming end faces, a friction disc in each collar member abutting one such end face, a closure disc overlying each friction disc and disposed in the collar member, a retaining bolt extending through said closure discs, friction discs, end faces and tubular member, a web extending radially from said tubular member, a tube having its axis in alignment with the plane of said web and provided with a bifurcated ring secured to said web, a disc extending from the distal edge of the web and disposed in the ring bifurcation, a friction disc on each side of the web disc, a closure disc overlying each friction disc and a retaining bolt extending through the web disc, bifurcated ring, friction discs and closure discs, each of the said retaining bolts being individually adjustable to provide a desired amount of friction in its subassembly, whereby said tube is movable into any one of a multiplicity of angular positions with relation to the base and under a pre-selected amount of friction, a tip, one end of which is receivable in said tube, guides spaced along said tip, an endless length of fishing line extending through said guides and forming a loose loop, a clip releasably attached to said loop of fishing line and a fishing pole having a fishing line releasably held by said clip.

4. A plurality of outriggers, tips and fishing poles constructed according to claim 3 and arranged in spaced relationship on the same boat, whereby the fishing lines of said fishing poles remain unentangled during fishing operations.

References Cited in the file of this patent

UNITED STATES PATENTS

| | | |
|---|---|---|
| 2,500,048 | Stoiber | Mar. 7, 1950 |
| 2,692,106 | Herrmann | Oct. 19, 1954 |
| 2,749,648 | Schneider | June 12, 1956 |